(12) United States Patent
Saarvali et al.

(10) Patent No.: US 7,063,766 B2
(45) Date of Patent: *Jun. 20, 2006

(54) METHOD FOR PRODUCING A MULTI-PLY WEB OF FLEXIBLE MATERIAL, SUCH AS PAPER AND NONWOVEN, AND MULTI-PLY MATERIAL PRODUCED BY THE METHOD

(75) Inventors: Eva-Li Saarvali, Vastra Frolunda (SE); Anna Mansson, Molndal (SE); Anders Andersson, Stenungsund (SE)

(73) Assignee: SCA Hygiene Products AB, Goteborg (SE)

( * ) Notice: Subject to any disclaimer, the term of this patent is extended or adjusted under 35 U.S.C. 154(b) by 293 days.

This patent is subject to a terminal disclaimer.

(21) Appl. No.: 10/409,075

(22) Filed: Apr. 9, 2003

(65) Prior Publication Data

US 2004/0009327 A1    Jan. 15, 2004

Related U.S. Application Data

(60) Provisional application No. 60/370,731, filed on Apr. 9, 2002.

(51) Int. Cl.
*B32B 31/08*    (2006.01)
(52) U.S. Cl. .................. 156/291; 156/209; 156/219; 156/324
(58) Field of Classification Search .............. 156/199, 156/201, 209, 291, 324, 553; 428/152–154, 428/172, 198, 211.1; 162/211–212

See application file for complete search history.

(56) References Cited

U.S. PATENT DOCUMENTS

| | | | |
|---|---|---|---|
| 3,672,950 A * | 6/1972 | Murphy et al. | 428/154 |
| 5,736,223 A | 4/1998 | Laurent | |
| 5,906,711 A | 5/1999 | Barnholtz | |
| 6,638,605 B1 * | 10/2003 | Ankuda et al. | 428/198 |
| 2003/0198788 A1 * | 10/2003 | Andersson et al. | 428/195.1 |

FOREIGN PATENT DOCUMENTS

| | | |
|---|---|---|
| DE | 195 34 812 A1 | 3/1997 |
| EP | 0 264 676 A1 | 4/1988 |
| EP | 0 738 588 A1 | 10/1996 |
| EP | 1 081 284 A1 | 3/2001 |
| WO | 99/44814 | 9/1999 |

* cited by examiner

*Primary Examiner*—Jessica Rossi
(74) *Attorney, Agent, or Firm*—Young & Thompson

(57) ABSTRACT

Method for producing a multi-ply web comprising at least three plies of flexible material, such as paper and nonwoven material and a multi-ply product produced according to the method. A first and second ply are glued together with a first glue pattern and a second and third ply are glued together with a second glue pattern which is applied offset with respect to the first glue pattern.

8 Claims, 2 Drawing Sheets

METHOD FOR PRODUCING A MULTI-PLY WEB OF FLEXIBLE MATERIAL, SUCH AS PAPER AND NONWOVEN, AND MULTI-PLY MATERIAL PRODUCED BY THE METHOD

CROSS REFERENCE TO RELATED APPLICATION

This application claims the benefit of U.S. Provisional Application No. 60/370,731, filed on Apr. 9, 2002.

FIELD OF THE INVENTION

The present invention refers to a method for producing a multi-ply web comprising at least three plies of flexible material, such as paper and nonwoven material, by means of gluing the plies. Especially it refers to production of tissue products such as toilet and kitchen paper, paper towels, hand towels, napkins, handkerchiefs, wiping material and the like. The invention further refers to a multi-ply web of flexible material, such as paper and nonwoven, comprising at least three plies, which are interconnected, by means of gluing in discrete glue sites.

BACKGROUND OF THE INVENTION

It is very common to laminate two or more tissue plies in order to produce the final tissue product. Herewith a more flexible and softer tissue product is obtained as compared to if one single ply with a corresponding thickness and basis weight had been produced as for the laminated product. The absorbent capacity and the bulk are moreover improved.

The lamination of two or more tissue plies is often made by means of gluing. A mechanical embossing of the plies is also often performed before they are glued together. It is further known to laminate two plies only by means of a mechanical embossing, at which a mechanical joining of the plies occurs in the embossing sites.

Through for example EP-A-796 727 it is known to first emboss two paper plies in a three dimensional structure with alternating raised and recessed portions, after which glue is applied to one of the plies and the two plies are joined in a press nip between two embossing rolls, so that the raised portions of the respective plies are glued to each other. A similar embossing procedure is shown in EP-A-738 588, according to which the glue also has a colouring effect.

In WO 95/08671 there is disclosed an example of so called nested embossing, in which the two individually embossed plies are combined and joined with the raised portions of one ply nesting into the recessed portions of the opposite ply.

Through U.S. Pat. No. 5,443,889 there is known a procedure for laminating two paper plies, which are fed over a pattern roll each, said pattern rolls having alternating raised and recessed portions and where glue is applied to one ply while this is led over the roll. The two paper plies are then glued together in a nip between the two pattern rolls, which are in register with each other so that a joining and compression of the paper plies occurs in a pattern corresponding to the protuberances of the pattern rolls.

A drawback that occur in connection with embossing a paper web where this is compressed in spots, is that a considerable strength reduction occurs in the embossing sites, which effects the strength properties of the entire paper product. Strength reductions of up to 70% of an embossed paper as compared to a corresponding non-embossed paper are not unusual.

U.S. Pat. No. 3,672,950 discloses a method for producing a quilted or cushioned adhesively laminated tissue product in which glue is applied in a certain pattern to one tissue ply in a press nip between a first pattern roll and an impression roll. This ply is laminated to another ply in a press nip between the same impression roll and a second pattern roll having a pattern corresponding with that of the first pattern roll and driven in registry with the first pattern roll. The two plies are in different conditions of stress during the lamination process, so that a quilted or cushioned product is provided.

Laminating three or more tissue plies together by gluing can be made in different ways. According to one alternative embodiment an embossing unit comprising two embossing nips defined by an embossing roll and a marrying roll providing a nested configuration of the embossed and laminated web and further comprising a glue applicator, as disclosed in for example U.S. Pat. No. 3,867,225, is used, with the modification that two plies are fed together into at least one of the embossing nips. Using this technique for laminating three or more plies gives a rather stiff product since the glue has to penetrate completely through the middle layer(s) in order to glue all layers together. An insufficient penetration of the glue through the middle layer(s) will not provide a sufficient plybonding effect.

According to an alternative embodiment three or more plies may be joined together by mechanical plybonding by so called male-to-flat or male-to-male embossing. The embossing is normally made only along the edge portions of the tissue product, so called edge embossing, as is disclosed in for example U.S. Pat. No. 1,774,497, but may also be made over the entire surface of the product. EP-A-436 170 discloses a multiply tissue product comprising two or more plies that are individually embossed and laminated together by edge embossing. It is difficult to achieve a sufficient plybonding with mechanical embossing only, especially when only the edge portions are embossed.

SUMMARY OF THE INVENTION

The object of the present invention is to provide a method for producing a multi-ply web of flexible material, such as paper and nonwoven, wherein at least three plies of flexible material are laminated together by gluing. The lamination should provide a good plybonding and be lenient to the material so that the structure of the plies is substantially maintained as well as its strength properties. The absorbent capacity and bulk of the finished product should moreover be high as well as its drapability properties.

This has according to the invention been provided by bringing a first patterned glue transfer roll, having a three dimensional pattern of protuberances in contact with a first glue application device, and transferring glue to a first web shaped flexible material in a first press nip in a pattern corresponding to the configuration of the protuberances, bringing a second web shaped flexible material in contact with the glue applied side of said first web shaped flexible material in a second press nip between a first patterned lamination roll having a three dimensional pattern of protuberances corresponding to the pattern of said first glue transfer roll and an impression roll, the first glue transfer and lamination rolls being in registry with each other, so that the first and second web shaped flexible material are pressed and glued together in a pattern corresponding to the configuration of the protuberances of said first glue transfer roll; subsequently bringing a second patterned glue transfer roll having a three dimensional pattern of protuberances in contact with a second glue application device, and transfer glue to one external side of the combined first and second web shaped flexible materials in a third press nip in a pattern corresponding to the configuration of the protuberances of said second glue transfer roll, said pattern being applied offset with respect to the glue pattern applied by the first glue transfer roll, a third web shaped flexible material being brought in contact with the glue applied side of said combined first and second web shaped flexible materials in a fourth press nip between a second patterned lamination roll having a three dimensional pattern of protuberances corresponding to the pattern of said second glue transfer roll and an impression roll, the second glue transfer and lamination rolls being in registry with each other, so that the third web shaped flexible material is pressed and glued to the combined first and second web shaped flexible materials in a pattern corresponding to the configuration of the protuberances of said second glue transfer rolls.

Since the glue sites between the different plies are offset with respect to each other the individual plies can move more freely relative to each other than if they would have been glued together in joint glue sites. Relative movements can take place both in lateral and transverse direction relative to the plane of the plies, which contributes to the drapability of the laminated material.

In one embodiment of the invention, at least one of the plies before lamination with the opposite ply is exerted to a three-dimensional patterning provided on the material while wet, during drying of the wet material and/or in dry state.

The size of each glue site preferably amounts to between 0.15 and 150 mm$^2$, preferably between 0.5 and 100 mm$^2$, more preferably between 1 and 15 mm$^2$. The number of glue sites per area unit should amount to between 25 per m$^2$ to 150 per cm$^2$, preferably between 300 per m$^2$ to 50 per cm$^2$ and more preferably between 800 per m$^2$ to 20 per cm$^2$. It is pointed out that the glue sites may be regularly distributed over the area of the web shaped material, but they may also be irregularly distributed, for example arranged in groups spaced apart.

The glue sites can be of any optional shape, such as small points, lines, figures, letters, fantasy patterns etc.

The invention further refers to a multi-ply web of flexible material, such a paper and nonwoven, comprising at least three plies which are interconnected by gluing in a plurality of discrete glue sites, a first and second ply of said multi-ply web being glued together in a first glue pattern comprising a plurality of spaced discrete glue sites and that a third ply is glued to the combined first and second plies in a second glue pattern comprising a plurality of spaced discrete glue sites which are offset with the glue sites of said first glue pattern.

In one embodiment substantially all glue sites of the second glue pattern are applied offset with respect to the glue sites of the first glue pattern.

At least one glue pattern may be provided by a coloured glue.

In one embodiment at least one of the plies has deliberately made holes therein.

The multi-ply web may further be embossed after lamination.

Further features of the invention are disclosed in the following description and in the claims.

BRIEF DESCRIPTION OF DRAWINGS

The invention will in the following be closer described with reference to an embodiment shown in the accompanying drawings.

DETAILED DESCRIPTION OF THE INVENTION

Figure 1:
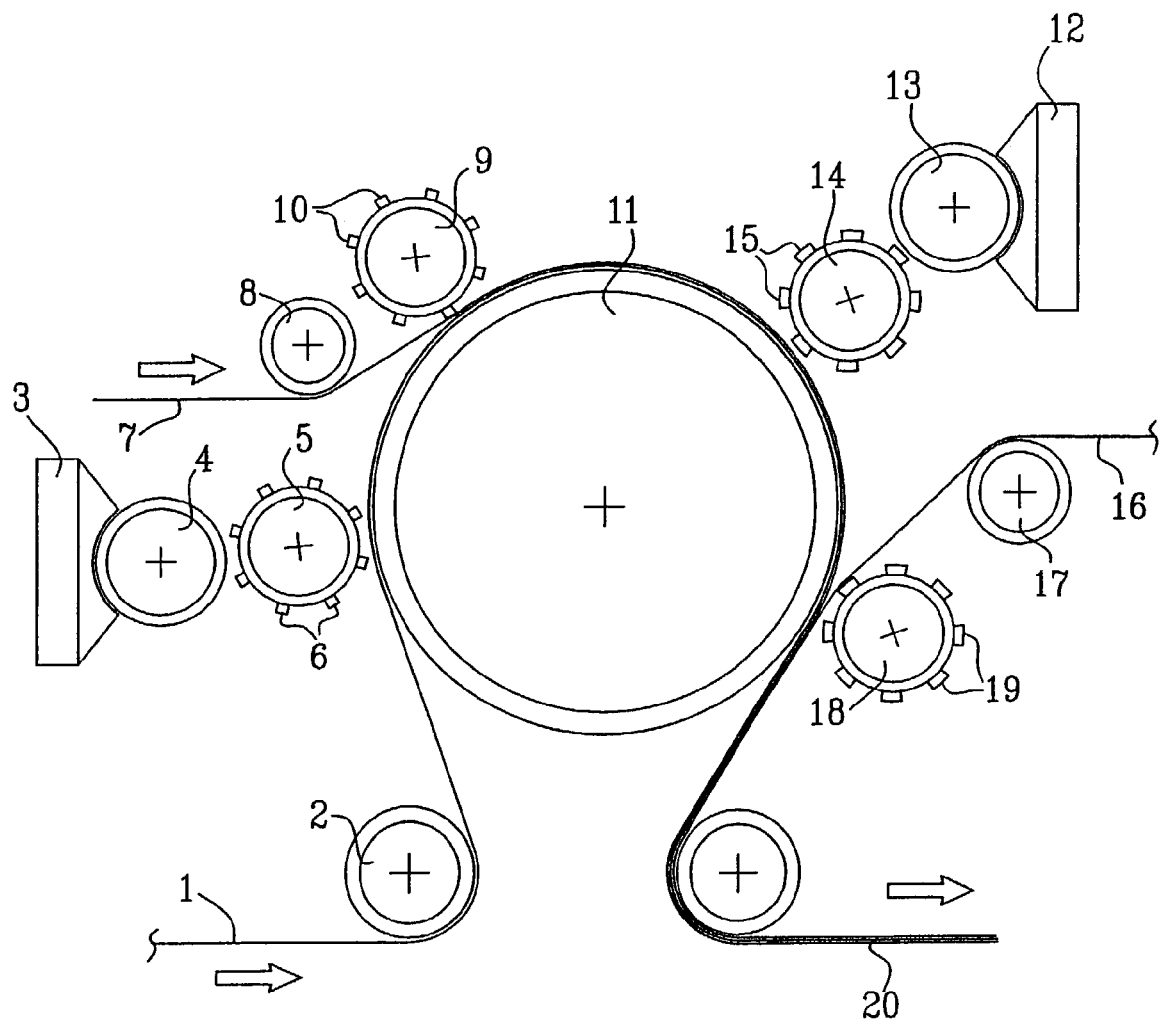
FIG. 1 shows a schematic side view of a device for performing the method according to the invention.

FIG. 1 shows a device for producing a three-ply material, e.g. paper, especially tissue paper. A first paper web 1 is fed over a roll 2 towards a glue application station. This comprises a glue chamber 3 from which glue is applied on a glue roll 4. The glue roll 4 is in contact with a first patterned glue transfer roll 5, which along its periphery is provided with a pattern of protuberances 6. The glue roll 4 is only contacting the tops of the protuberances 6, so that glue is only applied thereon. The paper web 1 is passed into a press nip between the first glue transfer roll 5 and a centrally placed impression roll 11. Glue will thus be applied to the first paper web 1 in a first glue pattern corresponding to the configuration of the tops of the protuberances 6. The pressure in the press nip between the pattern roll 5 and the impression roll 11 is only sufficiently high to accomplish a transfer of glue to the paper web 1. However there should preferably be no deformation of the paper web, i.e. no impression of the protuberances 6 of the pattern roll 5 into the paper web.

Figure 4:
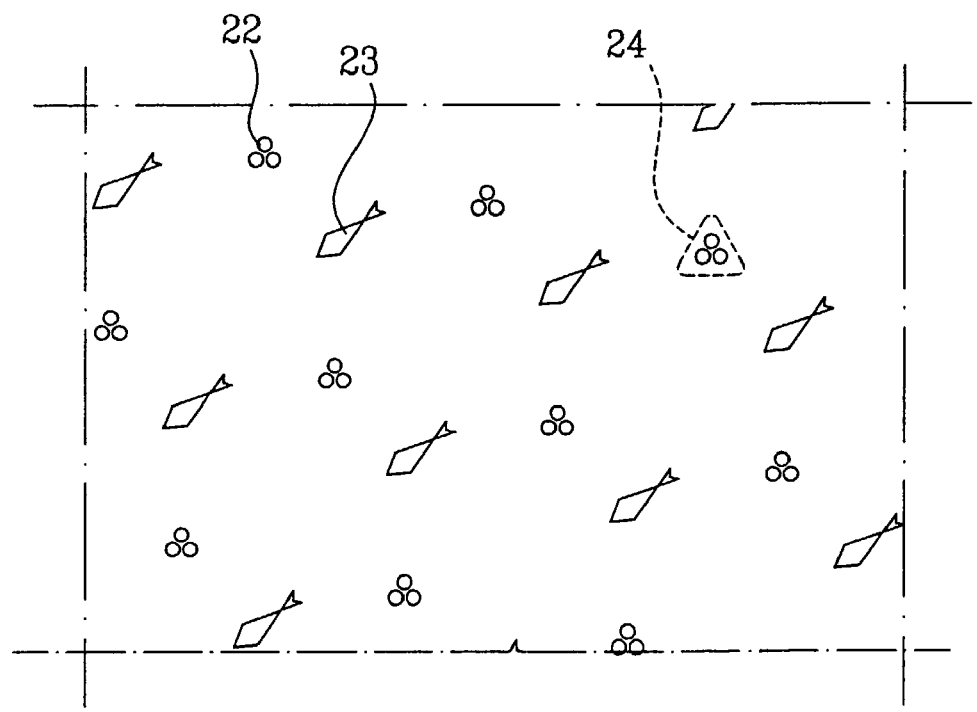
FIG. 4 a plan view of two glue patterns which are applied offset with respect to each other.

A second paper web 7 is fed over a roll 8 and into a press nip between a first pattered lamination roll 9 and the centrally placed impression roll 11. The first lamination roll 9 has a three dimensional pattern of protuberances 10 corresponding to the pattern of the first glue transfer roll 5. The term "corresponding to" in this respect means that the protuberances 10 either have the same shape and size of the effective surface area as the protuberances 6 of the first glue transfer roll 5, the same shape but a larger effective surface area than the protuberances 6 of the first glue transfer roll 5 so as to extend outside the outer circumference of the glue sites provided by the first glue transfer roll 5 or a different shape and a larger effective surface area than the protuberances 6 of the first glue transfer roll 5. For example a glue pattern provided by the first glue transfer roll 5 may be in the form of groups of three dots arranged in a triangular pattern 22 as shown in FIG. 4, wherein the protuberances 10 of the first lamination roll 9 may either be exactly the same as or slightly larger than the glue pattern, or may for example be in the form of a triangle 24 covering the three dots, as indicated with broken lines in FIG. 4. In all these cases the relative position of the pattern on the two patterned rolls 5 and 9 are in correspondence with each other.

The web tension of said first and second plies 1 and 7 are preferably substantially equal as they are fed into the second press nip. Herewith there will be no foreshortening effect from the lamination. The two patterned rolls 5 and 9 are driven in registry with each other so that the first and second paper webs 1 and 7 are pressed and glued together in a pattern corresponding to the configuration of the glue pattern provided by the first glue transfer roll 5.

It is preferred that one central impression roll 11 is used for both the first glue transfer roll 5 and lamination roll 9, as is shown in FIG. 1. However it would of course also be possible to use two or more separate impression rolls for the glue transfer roll 5 and the lamination roll 9, and to synchronize them so that they are driven in registry. Also in this second press nip the pressure should be low but sufficiently high to provide a sufficient gluing together of the two paper plies 1 and 7. The pressure in the second press nip should not be higher than to cause only slight compacting impressions 21 just opposite the glue sites in the second ply 7 facing the first lamination roll 9.

The thus laminated first and second plies 1 and 7 are then fed towards a second glue application station comprising a glue chamber 12 from which glue is applied on a glue transfer roll 13. The glue transfer roll 13 is in contact with a second patterned glue transfer roll 14, which along its periphery is provided with a pattern of protuberances 15. The second glue transfer roll 14 transfers glue to the external side of the second ply 7 in a third press nip in a second glue pattern corresponding to the configuration of the tops of the protuberances 15. The pressure in the press nip between the second glue transfer roll 14 and the impression roll 11 is only sufficiently high to accomplish a transfer of glue to the paper web 1. However there should preferably be no deformation of the paper web, i.e. no impression of the protuberances 15 of the glue transfer roll 14 into the paper web 7.

The second glue pattern is applied offset with respect to the first glue pattern applied by the first glue transfer roll 5. A third ply 16 is brought in contact with the glue applied side of the second ply 7 in a fourth press nip between a second patterned lamination roll 18 having a three dimensional pattern of protuberances 19 corresponding to the pattern of the second glue transfer roll 14 and the impression roll 11. The term "corresponding to" in this respect is as defined above with respect to the first glue transfer roll 5 and lamination roll 9. The second glue transfer roll 14 and second lamination roll 18 are in registry with each other, so that the third ply 16 is pressed and glued to the combined first and second plies 1 and 7 in a pattern corresponding to the configuration of the tops of the protuberances 15 of said second glue transfer roll 14.

Also in this fourth press nip the pressure should be low but sufficiently high to provide a gluing together of the combined plies. The pressure in the press nip should not be higher than to cause only slight compacting impressions 25 just opposite the glue sites in the third ply facing the second lamination roll 18.

The surface of said multi-ply web facing the central impression roll 9 will substantially maintain its structure unaffected by the lamination process with no compacting impressions in the material opposite the glue sites. The laminated multi-ply product is denoted 20.

It is preferred that one central impression roll 11 is used for all pattern rolls 5, 9, 14 and 18, as is shown in FIG. 1. However it would of course also be possible to use two or more separate impression rolls for one or more of said pattern rolls, and to synchronize them so that they are driven in registry.

The pattern on the glue transfer rolls 5 and 13 can be optional, but should be chosen so that glue is applied to the paper web 1 in an amount corresponding to between 0.03 and 9%, preferably between 0.1 and 6% of the total surface area of the paper web 1. In the present case the glue sites are sparsely distributed over substantially the entire area of the laminated product. It is with the method according to the invention possible to provide a very distinct positioning of the glue sites, wherein a very small amount of glue is needed. This means advantages with respect to softness, drapability, absorption etc. The number of glue sites per area unit should amount to between 25 per $m^2$ to 150 per $cm^2$, preferably between 300 per $m^2$ to 50 per $cm^2$ and more preferably between 800 per $m^2$ to 20 per $cm^2$. The size of each glue site should amount to between 0.15 and 150 $mm^2$, preferably between 0.5 and 100 $mm^2$ and more preferably between 1 and 15 $mm^2$.

In the case of large glue sites screened patterns can be used, which means that each glue pattern unit is built up of a plurality of small screen dots. The size of the glue site in this case is defined as the circumscribed area of the combination of screen dots forming a glue pattern unit.

Preferred glues are the ones commonly used for paper, such as carboxy methyl cellulose (CMC), polyvinyl alcohol (PVOH), ethylene vinyl acetate (EVA), polyvinyl acetate (PVAc), ethylene acrylic acid, vinyl acetate acrylic acid, styrene acrylic acid, polyurethane, polyvinylidene chloride, starch, chemically modified starch, dextrin, water soluble polymers such as latexes and milky colloids in which natural or synthetic rubber or plastic is suspended in water. In case the material webs are of other material than paper glues suited for these materials are of course chosen.

Coloured glues may also be used, which gives a visual effect and therewith a patterning effect to the material.

Figure 2:
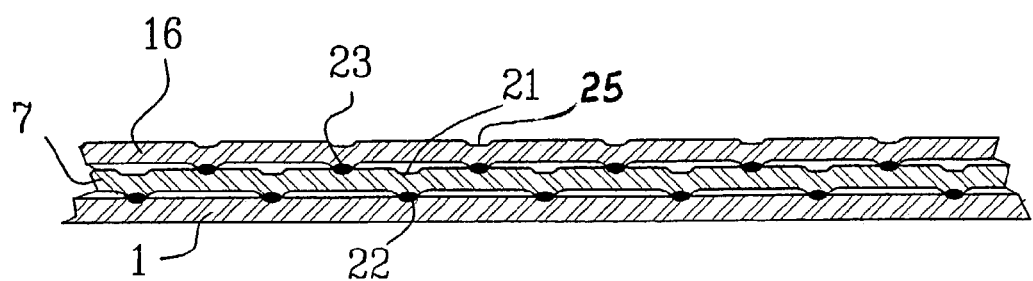
FIG. 2 is a schematic cross section of a three-ply paper produced according to the method.

In FIG. 2 there is shown an example of a three-ply paper produced according to the invention, at which the glue sites between the first and second plies 1 and 7 are denoted 22 and the glue sites between the second and third plies 7 and 16 are denoted 23. Between the glue sites 22 the paper plies 1 and 7 and between the glue sites 23 the paper plies 7 and 16 are free and not attached to each other and void volumes are created which increase the bulk and absorption capacity of the material, properties that are important for e g soft and absorbent paper. Substantially the entire bulk from the separate plies is maintained after the lamination. The second ply 7 and the third ply 16 can just opposite the glue sites 22 and 23 respectively have slight compacting impressions 21 caused by the pattern rolls 9 and 18 respectively.

Preferably substantially all glue sites 23 of the second glue pattern are applied offset with respect to the glue sites 22 of the first glue pattern. The term "offset" means that when seen in a plan view from above substantially all, or at least 90% of the glue sites 23 of the second glue pattern do not overlap with any glue sites 22 of the first glue pattern. The term "overlap" means that at least part of the surface areas of the glue sites are overlapping, but does not include that the glue sites are in tangent with each other. Thus the expression "do not overlap" includes that the glue sites 23 of the second glue pattern, when seen in a plan from above, may be in tangent with or totally separate from the glue sites 22 of the first glue pattern.

Since the first and second glue patterns are applied offset with respect to each other the individual plies can move more freely relative to each other than if they would have been glued together in joint glue sites. Relative movements can take place both in lateral and transverse direction relative to the plane of the plies, which contributes to the drapability of the laminated material.

The paper webs 1, 7 and 16 that are laminated can be either smooth but also have a three-dimensional structure provided earlier in the process, for example during forming, dewatering and/or drying of the paper web. A three-dimensional structure may also be provided by embossing the dry paper webs before lamination. The method according to the invention is very lenient to such a pattern, so that this is maintained substantially intact throughout the laminating process. Another important advantages of the invention is that the paper substantially maintains its strength properties through the process, which in many other lamination processes, in which an embossing and deformation of the paper webs occur in connection with lamination, are decreased. Because of the substantially smooth structure of the laminated multiply product this can be converted into dense rolls or folded products, which means space- and cost saving.

The laminated multiply product may also if desired, due to the strong ply bonding provided by the glue spots, be embossed after the lamination process, thereby creating a softer material. The effective ply bonding is achieved due to the distinct gluing effect provided by the first and second lamination rolls 9 and 18 driven in registry with the respective glue transfer rolls 5 and 14 respectively.

Figure 3:
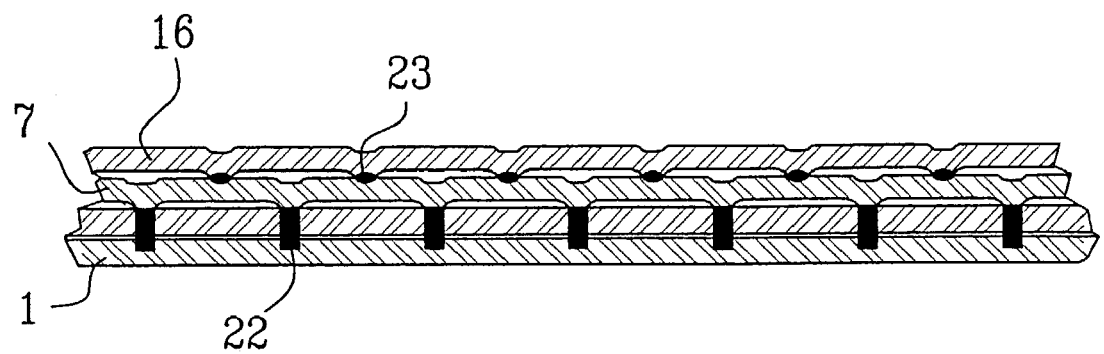
FIG. 3 is schematic cross section of a four-ply paper produced according to the method.

FIG. 3 shows an example of first and second glue patterns, wherein the glue sites 23 of the second glue pattern are arranged half-way between the glue sites 22 of the first glue pattern. Four or more paper plies may of course be laminated with the method described above. In one alternative three or more glue stations may be arranged to apply glue patterns, which are offset with respect to the previous and/or the subsequent glue pattern. However every second glue pattern may overlap, if desired. Two or more plies may further enter the first, second and/or third press nips, wherein four or more plies may be laminated in two glue stations. When entering two or more plies into a glue station, the glue must penetrate into both or all plies. This is illustrated in FIG. 3 and may be accomplished by choosing a glue with appropriate properties, for example viscosity.

Glues with different properties with respect to for example viscosity may be used in the different glue stations. When the glue shall penetrate into two or more layers, as illustrated in FIG. 3, a glue having a lower viscosity is preferably used. Different glue may also be used when laminating plies of different material.

Different kind of paper with different properties with respect to absorption capacity, basis weight, manufacturing technique, fiber composition, chemical additives may be used in the different plies.

The method is further suitable to use for paper plies having deliberately made holes therein, since the main part of the holes will be intact throughout the lamination process and not be filled with glue, which normally is the case when gluing the plies together. The term "deliberately made holes" means holes that have been made by mechanical perforation or holes that have been made in connection with forming and/or drying the paper web.

The invention claimed is:

1. Method for producing a multi-ply web comprising at least three plies of flexible material by gluing the plies, which comprises:

bringing a first patterned glue transfer roll, having a three dimensional pattern of protuberances in contact with a first glue application device, and transferring glue to a first web shaped flexible material in a first press nip in a first glue pattern corresponding to the configuration of the protuberances;

bringing a second web shaped flexible material in contact with the glue applied side of said first web shaped flexible material in a second press nip between a first patterned lamination roll having a three dimensional pattern of protuberances corresponding to the pattern of said first patterned glue transfer roll and an impression roll;

driving the first glue transfer and lamination rolls in registry with each other, so that the first and second web shaped flexible materials are pressed and glued together in a pattern corresponding to the configuration of the protuberances of said first glue transfer roll;

bringing a second patterned glue transfer roll having a three dimensional pattern of protuberances in contact with a second glue application device, and transferring glue to one external side of the combined first and second web shaped flexible materials in a third press nip in a second glue pattern corresponding to the configuration of the protuberances of said second glue transfer roll; said second glue pattern being applied offset with respect to the glue pattern applied by the first glue transfer roll;

bringing a third web shaped flexible material in contact with the glue applied side of said combined first and second web shaped flexible materials in a fourth press nip between a second patterned lamination roll having a three dimensional pattern of protuberances corresponding to the pattern of said second glue transfer roll and said impression roll; the second glue transfer and lamination rolls being in registry with each other, so that the third web shaped flexible material is pressed and glued to the combined first and second web shaped flexible materials in a pattern corresponding to the configuration of the protuberances of said second glue transfer roll.

2. Method as claimed in claim 1, wherein at least one of the web shaped flexible materials before lamination with the other web shaped materials is exerted to a three dimensional patterning provided on the material while wet, during drying of the wet material or in dry state.

3. Method as claimed in claim 1, wherein substantially all glue sites of the second glue pattern are applied offset with respect to the glue sites of the first glue pattern.

4. Method as claimed in claim 1, wherein the size of each glue site amounts to between 0.15 and 150 $mm^2$.

5. Method as claimed in claim 1, wherein the number of glue sites per unit area amounts to between 25 per $m^2$ to 150 per $cm^2$.

6. Method as claimed in claim 1, further comprising embossing the multi-ply web after lamination.

7. Method as claimed in claim 1, wherein the size of each glue site amounts to between 0.5 and 100 $mm^2$, and the number of glue sites per unit area amounts to between 300 per $m^2$ to 50 per $cm^2$.

8. Method as claimed in claim 7, wherein the size of each glue site amounts to between 1 and 15 $mm^2$, and the number of glue sites per unit area amounts to between 800 per $m^2$ to 20 per $cm^2$.

* * * * *